United States Patent [19]
Hayashi et al.

[11] Patent Number: 5,541,619
[45] Date of Patent: Jul. 30, 1996

[54] DISPLAY APPARATUS AND METHOD OF DRIVING DISPLAY PANEL

[75] Inventors: Masatomo Hayashi; Hiroshi Maeda; Yasuji Yabe; Masao Obata; Masaki Arima, all of Nara-ken, Japan

[73] Assignee: Sharp Kabushiki Kaisha, Osaka-fu, Japan

[21] Appl. No.: 135,657

[22] Filed: Oct. 14, 1993

Related U.S. Application Data

[63] Continuation of Ser. No. 870,768, Apr. 20, 1992, abandoned, which is a continuation of Ser. No. 437,272, Nov. 16, 1989, abandoned.

[30] Foreign Application Priority Data

Nov. 18, 1988 [JP] Japan ................... 63-293118

[51] Int. Cl.$^6$ ................... G09G 3/36
[52] U.S. Cl. ................... 345/96; 345/94
[58] Field of Search ................... 340/784, 805, 340/793; 358/236, 241; 350/332, 333; 359/54, 56; 345/87, 88, 89, 94, 97, 96

[56] References Cited

U.S. PATENT DOCUMENTS

| 4,556,880 | 12/1985 | Hamada ................... 340/784 |
| 4,635,127 | 1/1987 | Togashi ................... 358/241 |
| 4,808,991 | 2/1989 | Tachiuchi et al. ................... 340/784 |
| 4,955,696 | 9/1990 | Taniguchi et al. ................... 340/784 |
| 5,038,139 | 8/1991 | Fujisawa et al. ................... 340/793 |

FOREIGN PATENT DOCUMENTS

| 0214856 | 5/1986 | European Pat. Off. . |
| 0214857 | 5/1986 | European Pat. Off. . |
| 2164776 | 8/1985 | United Kingdom . |

*Primary Examiner*—Ulysses Weldon
*Assistant Examiner*—Chanh Nguyen

[57] ABSTRACT

A display apparatus of a simple matrix type displays an intermediate tone on a liquid panel by a data thinning-out system. As a modulated alternating inverted signal for determining a polarity of a driving voltage is applied to each pixel of the liquid panel, employed is a signal whose phase is inverted by 180° every tone representing cycle which is a predetermined period of a plurality of frames, and it is structured such that a polarity of the driving voltage to be applied to each pixel is changed according to polarity of the modulated alternating inverted signal. Therefore, a positive polarity portion and a negative polarity portion of an effective voltage to be applied to a pixel in an arbitrary tone representing cycle are completely canceled by a negative polarity portion and a positive polarity portion of the driving voltage to be applied to the pixel in a tone representing cycle adjacent to said arbitrary tone representing cycle respectively. As a result, each of mean values of effective voltages applied to respective pixels in the two adjacent tone representing cycles becomes zero, so that no direct voltage is applied to the liquid crystal panel.

18 Claims, 8 Drawing Sheets

FIG.6A $\overline{\text{RESET}}$
FIG.6B Y
FIG.6C LP
FIG.6D $\overline{Y \cdot LP}$
FIG.6E M(=QA)
FIG.6F QB
FIG.6G X(=QC)
FIG.6H QD
FIG.6I MX (=M⊕X)

DISPLAY APPARATUS AND METHOD OF DRIVING DISPLAY PANEL

This application is a continuation, of application Ser. No. 07/870,768 filed on Apr. 20, 1992, now abandoned, which is a continuation of application Ser. No. 07/437,272 filed on Nov. 16, 1989, now abandoned.

BACKGROUND OF THE INVENTION

1. Field of the Invention

The present invention relates generally to display apparatus, and more particularly to display apparatus for displaying still pictures on a liquid crystal panel used in word processors, personal computers and the like.

2. Description of the Background Art

Liquid crystal panels have been widely used for display portions of word processors, personal computers and the like. A liquid crystal panel is comprised of two transparent substrates having transparent electrodes therein with liquid crystals filled therebetween. A display apparatus for representing a picture on a liquid crystal panel has two types, one of which is a static type in which a voltage is applied to each pixel from a corresponding driving circuit which is provided for each display pixel of the liquid crystal panel, and the other is a simple matrix type in which a voltage is applied in a time divisional manner to each pixel of the liquid crystal panel from a common driving circuit. The later is widely used when the number of liquid crystal panels is large, because a small number of driving circuits are required for the number of display pixels.

Figure 1A:
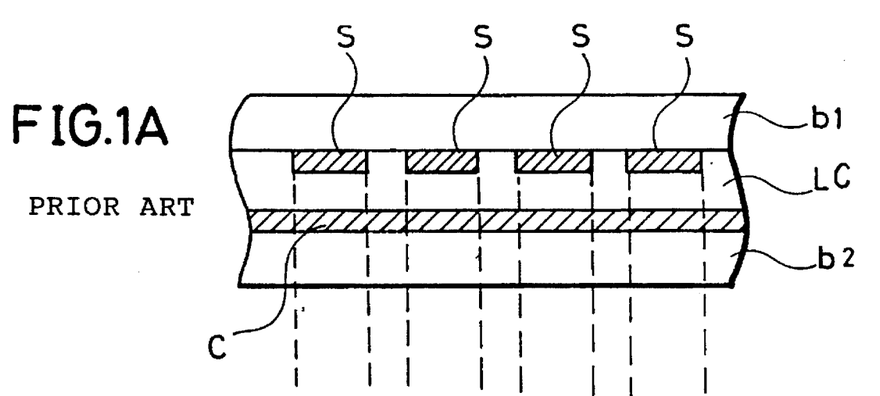
FIG. 1A is a sectional view showing a structure of a liquid crystal panel driven by a display apparatus of a simple matrix type.
Figure 1B:
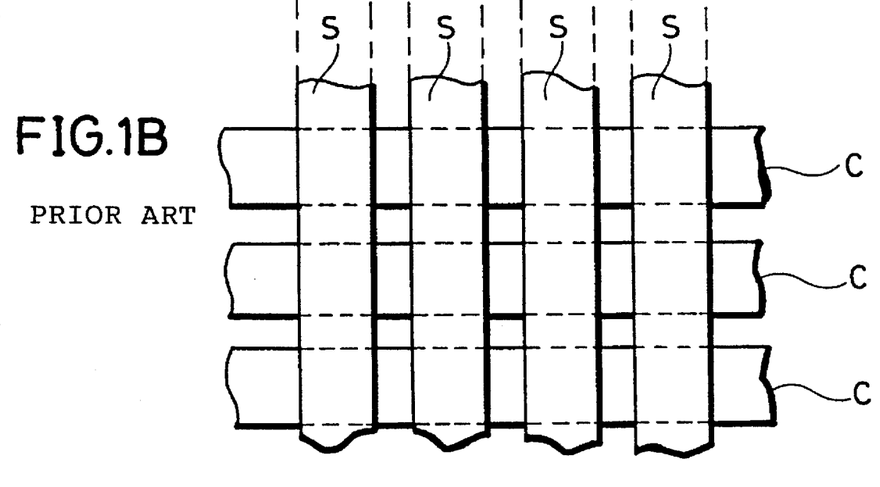
FIG. 1B is a plan view showing an arrangement of electrodes in the liquid crystal panel driven by the display apparatus of the simple matrix type.

FIGS. 1A and FIG. 1B are a schematic diagram of a liquid crystal panel of a display apparatus of a simple matrix type and a plan view showing an arrangement of a transparent electrode thereof, respectively.

Referring to FIG. 1A and FIG. 1B, in the liquid crystal panel of the simple matrix type display apparatus, a liquid crystal layer LC is interposed between a plurality of scanning electrodes C and a plurality of data electrodes S arranged in a direction so as to intersect with each other between two transparent substrates b1 and b2. In representing a picture, a selecting potential is sequentially applied to the scanning electrodes C with a potential corresponding to display data of a single row being applied to the data electrodes S. That is, the potential corresponding to the display data and the selecting potential are applied in a time divisional manner to each pixel corresponding to an intersection of a scanning electrode C and a data electrode S.

Application of a voltage above a certain threshold causes liquid crystal to enter a completely on state, where the light is passed through, and the application of a voltage below the threshold causes the liquid crystal to enter a completely off state where the light is not passed through. Accordingly, when a voltage corresponding to a difference between the potential corresponding to the display data and the selecting potential exceeds the threshold, the pixel enters an on-state, that is, it is driven to be on, and when the voltage corresponding to the difference is below the threshold, the pixel enters an off-state, that is, it is driven to be off. Basically, the simple matrix type display apparatus represents a picture on the liquid crystal panel by means of binary display indicating bright and dark by driving each pixel in a time divisional manner.

However, it is difficult to precisely reproduce subtle shades of the picture by the binary display which indicates no intermediate clarity. Therefore, it has been proposed to perform an intermediate tone display for displaying several intermediate levels of clarity with a simple matrix type display apparatus.

As one system for the intermediate tone display of a still picture, a data thinning-out system is known in which the ratio of an on-drive period of a pixel to an off-drive period in a predetermined period is changed according to the clarity to be displayed by the pixel. More specifically, a predetermined period of a plurality of frames, (tone representing cycle) is referred to as one cycle. Either of a potential corresponding to a display (bright) or a potential corresponding to a non-display (dark) is selectively applied to the data electrode every other frame period, such that among the plurality of frames constituting one cycle, the total number of frames in which a pixel is to be driven to be on, corresponds to a tone (clarity) to be displayed by the pixel. More specifically, the higher (lighter) the level of the tone displayed by the pixel, the higher the total number of frames of the cycle the pixel is to be driven on.

In the above-described data thinning-out system, for example, if an 8-frame period is determined as a tone representing cycle, a maximum of 9 tones can be represented.

FIG. 2 is a timing chart showing each voltage waveform applied to an arbitrary pixel when a tone pattern (a sequence of on-drive and off-drive in 8-frame period) is "1, 0, 0, 1, 1, 0, 0, 1" (wherein the on-drive is represented as "1" and the off-drive as "0") in a conventional display apparatus for displaying the above described tone representation. FIG. 2A shows a tone pattern, FIG. 2B shows a sequence of frames, FIG. 2C shows a waveform of a voltage applied to the data electrode, that is, a segment waveform, FIG. 2D shows a waveform of a voltage applied to the scanning electrode, that is, a common waveform, and FIG. 2E shows a waveform of an effective voltage applied to a pixel formed of a liquid crystal layer interposed between the data electrode and the scanning electrode, that is, a segment-common voltage waveform.

Figures 2A, 2B:
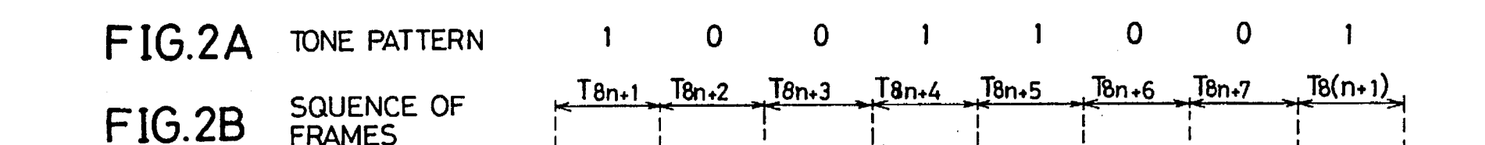
FIG. 2A to FIG. 2E are timing charts showing waveforms of voltages applied to an arbitrary pixel whose tone is displayed by a conventional display apparatus.
Figure 2C:
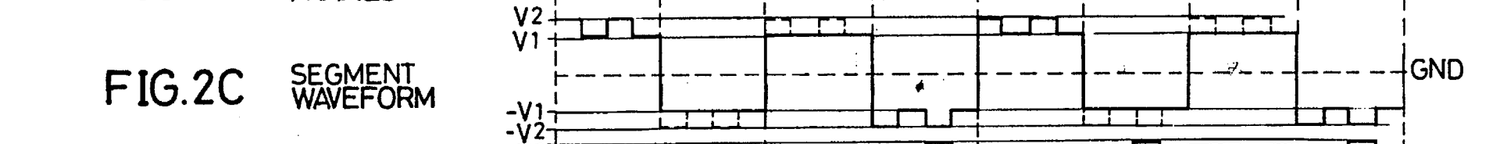
Figure 2D:
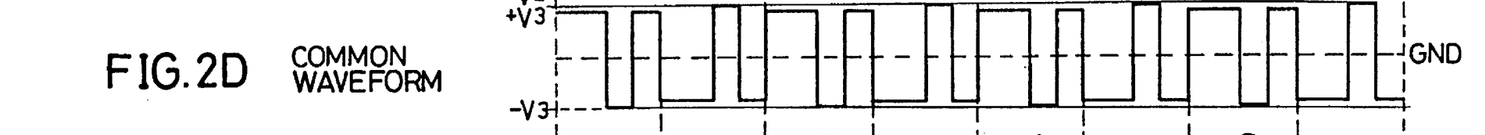

Referring to FIGS. 2C and 2D, the number of duties of voltages applied to the data electrode and the scanning electrode in one frame period is four, the voltage applied to the scanning electrode will be represented as the selecting potential plus V3 or minus V3 only for a ¼ frame period in one frame period. Polarities of the segment waveform and the common waveform are inverted every other frame.

Figure 2E:
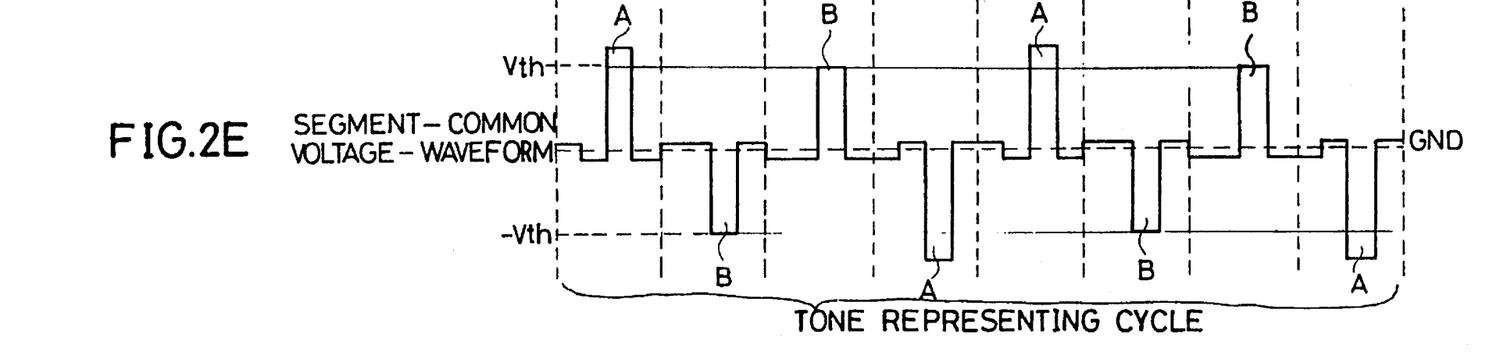

Now referring to FIG. 2C, while the segment waveform in the on-drive frame period includes portions exceeding a predetermined potential plus or minus V1 (a portion of a potential +V2), the segment waveform of the off-drive frame period includes no portion exceeding a predetermined potential plus or minus V1 (shown by a broken line). Due to a difference between a segment waveform of an on-drive frame period and a segment waveform of an off-drive frame period, while a portion A can be obtained in an on-drive frame period, which is above a threshold voltage ±Vth for driving a pixel to be on, the portion A which is above the threshold voltage ±Vth can not be obtained in an off-drive frame period, although a portion B which is approximate to the threshold voltage ±Vth can be obtained in an off-drive frame period (see FIG. 2E). In addition, since the polarities of the segment waveform and the common waveform are inverted every other frame as described above, a polarity of the segment-common voltage waveform is also inverted as shown in FIG. 2E, thereby alternatively driving a pixel.

In this case, of the 8-frame period, a portion A exceeding the threshold voltage ±Vth can be obtained in the segment-common voltage waveform in four frames. More specifically, since the pixel is driven to be on only four times during the 8-frame period, luminance of the pixel becomes visually dark, compared with a pixel driven to be on through a shorter time interval of each of the 8 frame periods (in case a tone pattern is "1, 1, 1, 1, 1, 1, 1, 1"), so that allied tone representation is performed. However, a tone pattern in case a pixel is driven to be on four times during the 8 frame period is not limited to this.

Figure 3A:
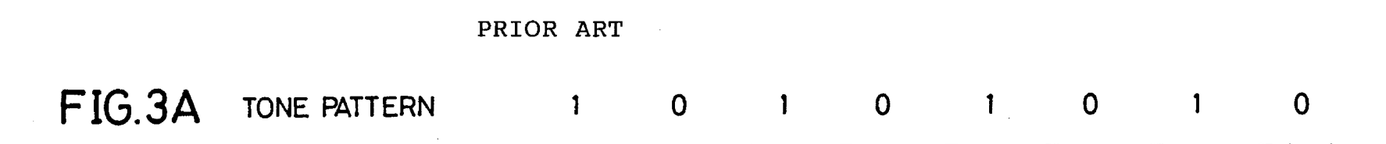
FIG. 3A to FIG. 3E are timing charts showing a waveforms of voltages applied to an arbitrary pixel whose tone is displayed by a conventional display apparatus in a tone pattern different from that shown in FIG. 2A.
Figure 3B:
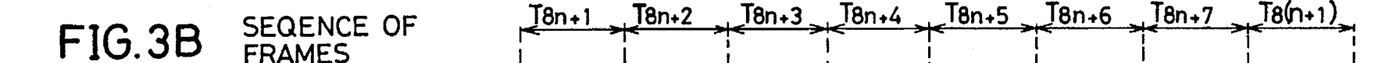
Figures 3C, 3D:
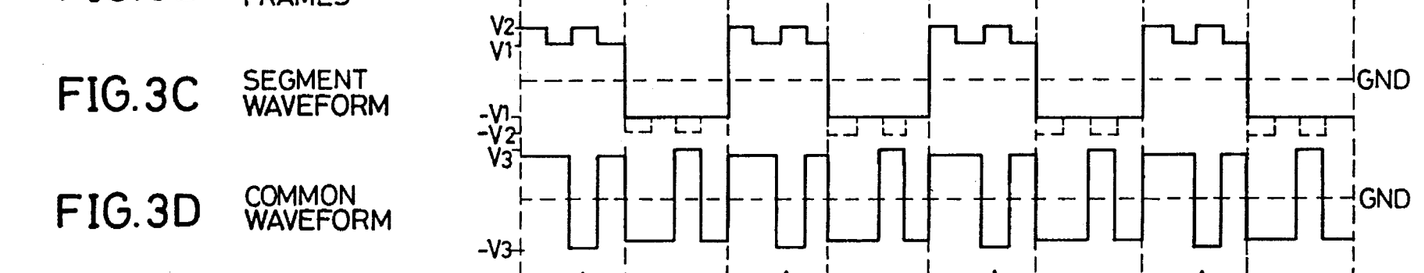
Figure 3E:
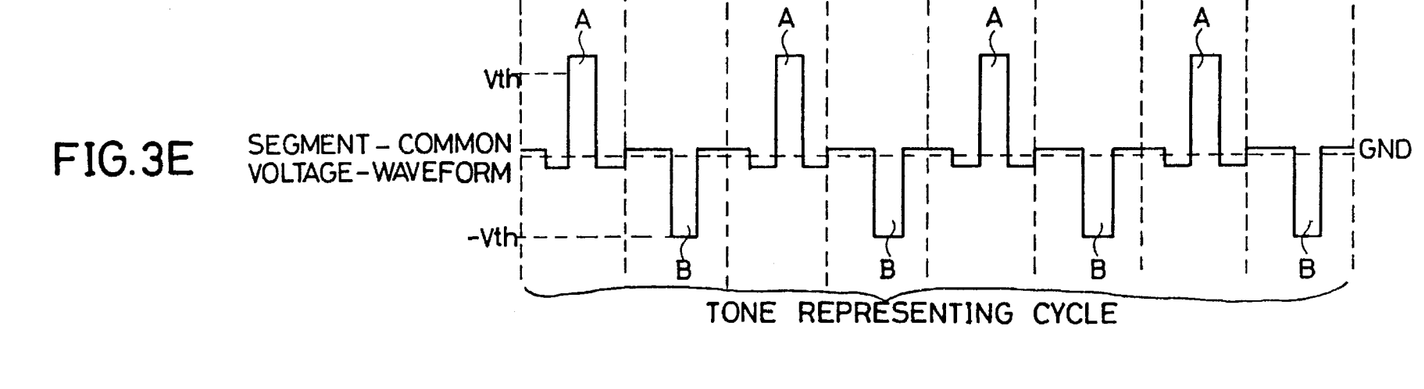

FIG. 3A to FIG. 3E are time charts showing each voltage waveform applied to an arbitrary pixel for representing the same tone as that of the above described example, the pixel is driven to be on only for four-frame period out of the 8 frame period with a tone pattern of "1, 0, 1, 0, 1, 0, 1, 0". FIG. 3A shows a tone pattern, FIG. 3B shows a sequence of frames, FIG. 3C shows a segment waveform, FIG. 3D shows a common waveform and FIG. 3E shows a segment-common voltage waveform.

In case the tone pattern is "1, 0, 0, 1, 1, 0, 0, 1" as shown in FIG. 2A to FIG. 2E, if a tone representing cycle is repeated, the pixel is driven to be on (or off) in succession every two frame periods. On the other hand, since the polarities of the segment waveform and the common waveform are inverted every other frame period, a segment-common voltage waveform in each of two frame periods $T_{8n+4}$ and $T_{8n+5}$ (in case of off-drive, $T_{8n+2}$ and $T_{8n+3}$, $T_{8n+6}$ and $T_{8n+7}$) in which the pixel is driven to be on (or off) in succession is completely symmetrical with respect to a ground potential GND (n=0, 1, 2 . . .). In addition, a segment waveform and a common waveform in each of a first frame period $T_{8n+1}$ and a last frame period $T_{8(n+1)}$ in which a pixel is driven to be on are completely symmetrical with respect to the ground potential GND, and each of their polarities is opposite to each polarity in frames before and after the 8-frame period (not shown). Accordingly, the segment-common voltage waveform in each of the first frame period $T_{8n+1}$ and the last-frame period $T_{8(n+1)}$ and the segment-common voltage waveforms in their adjacent frame periods which is not shown, are completely symmetrical with respect to the ground potential GND. As a result, a positive polarity portion and a negative polarity portion of the segment-common voltage completely cancel to each other every 8-frame period and 2-frame period. Accordingly, a mean value of the segment-common voltage applied to the pixel as an effective voltage always becomes 0 every 2-frame period and 8-frame period, so that when a tone is continuously represented in such a tone pattern, no direct voltage is applied to the liquid crystal layer forming a pixel.

However, in case a tone pattern is "1, 0, 1, 0, 1, 0, 1, 0" as shown in FIG. 3A to FIG. 3E, if the tone representing cycle is repeated, the on-drive and the off-drive are alternately performed every other frame period. Accordingly, segment-common voltage waveforms in respective two adjacent frame periods include a portion A above the threshold ±Vth and a portion B below the threshold ±Vth, respectively. Therefore, even though a polarity of the effective voltage applied is inverted every other frame, the segment-common voltage waveforms in any of the respective two adjacent frame periods of the 8-frame cycle are not symmetrical with respect to the ground potential GND. More specifically, in this case, a positive polarity portion and a negative polarity portion of a segment-common voltage do not completely cancel to each other in any period in which the tone representing cycle is repeated. As a result, a mean value of the segment-common voltage does not become 0 in any period in which the tone represented period is repeated, so that if displaying the tone is continued in such a tone pattern, a direct voltage continuously applied to a liquid crystal layer forming a pixel.

As can be seen from the foregoing, the direct voltage is continuously applied to the liquid crystal layer forming the pixel, depending on a setting of a tone pattern.

It is known that if the direct voltage is continuously applied to the liquid crystal layer forming the pixel, electric charges are stored in the electrodes having the liquid crystal provided therebetween, so that polarization occurs in the liquid crystal, which causes the liquid crystal to non-reversibly change to a certain state wherein an arrangement state of the liquid crystal molecules is determined by the applied direct voltage. If the liquid crystal forming the pixel enters such a state, an arrangement of the liquid crystal molecules does not correspond to the applied effective voltage, so that the picture becomes yellowish, whereby a picture to be represented correctly is no longer represented. Therefore, continuous application of a direct voltage to a liquid crystal forming a pixel adversely affects a liquid crystal layer, which causes deterioration of display performance of a liquid crystal panel.

In order to avoid a successive application of the direct voltage to the pixel, a tone pattern should be limited. However, in a tone display according to the above described data thinning-out system, a pixel is driven to be on/off according to a tone pattern. Accordingly, pixels other than those having tone patterns of "1, 1, 1, 1, 1, 1, 1, 1" and "0, 0, 0, 0, 0, 0, 0, 0" are turned on and off repeatedly at short time intervals according to a tone pattern. Therefore, if the interval of turning on and off is long, the turning on and off of the pixels are visible to the naked eye, resulting in a flickering phenomenon on a picture plane. In order to prevent such a flickering on the picture plane as much as possible, an interval of a turning on and off of a pixel is preferably short.

For example, in case of displaying the same tone, the flickering on the picture plane can be more easily prevented the using the tone pattern of "1, 0, 1, 0, 1, 0, 1, 0" shown in FIG. 3A to FIG. 3E rather than by the display using the tone pattern "1, 0, 0, 1, 1, 0, 0, 1" shown in FIG. 2A to FIG. 2E. However, the display using the former tone pattern allows a direct voltage to be applied to a liquid crystal.

As is clear from the foregoing, in a conventional tone display of the data thinning-out system, a direct voltage was applied to a pixel, depending on a setting of a tone pattern, so that it was difficult to prevent both a flickering on the picture plane due to a turning on and off of the pixel, and an application of a direct voltage to the pixel. More specifically, in selecting a tone pattern, any tone pattern is eliminated that causes a direct voltage to be applied to a liquid crystal, a range of selecting tone patterns becomes narrow, thereby making it difficult to minimize flickering on a picture frame. Therefore in a display apparatus for displaying a tone by a conventional data thinning-out system, a tone pattern is selected taking into account of deteriorated quality of the picture due to both the application of the direct voltage to the liquid crystal and the flickering on picture frame caused by turning on and off a pixel. More specifically, in a tone display of the data thinning-out system, a tone pattern is selected such that a compromising point can be found between suppression of the flickering on the picture frame and prevention of application of the direct voltage to the liquid crystal as much as possible. As a result, according to the tone display of the data thinning-out system performed by a conventional display apparatus, there was a limit to an improvement of a picture quality.

SUMMARY OF THE INVENTION

Therefore, an object of the present invention is to provide a display apparatus capable of displaying an intermediate tone, which can display an intermediate polarity without deterioration of picture quality.

Another object of the present invention is to provide a display apparatus capable of displaying a picture on a liquid crystal panel without adversely affecting the liquid crystal.

A further object of the present invention is to provide a display apparatus of a simple matrix type capable of displaying an intermediate tone without deterioration of the picture quality.

Still another object of the present invention is to provide a display apparatus of the simple matrix type capable of displaying an intermediate tone by the data thinning-out system without deterioration of the picture quality.

A still further object of the present invention is to provide a display apparatus of the simple matrix type capable of displaying a tone by the data thinning-out system without continuously applying a direct voltage to a pixel, irrespective of a tone pattern.

A still further object of the present invention is to provide a display apparatus capable of displaying a tone by the data thinning-out system, requiring no consideration of the application of a direct voltage to a pixel in setting a tone pattern.

A still further object of the present invention is to provide a method of driving a liquid crystal panel capable of displaying an intermediate tone thereon by the data thinning-out system without deterioration of the picture quality.

In order to achieve the above described objects, a liquid crystal display apparatus according to the present invention comprises a plurality of first electrodes which are parallel to each other and a plurality of second electrodes arranged in parallel to each other to intersect with the first electrodes, the intersections constituting pixels arranged in matrix, defining means for defining a tone representing cycle including a predetermined period of a plurality of frames as one cycle, signal generating means for generating, every period of integral multiple of a tone representing cycle defined by the defining means, a signal whose waveform is of an opposite polarity to that of a signal waveform in its adjacent period of the integral multiple of cycle, first electrode driving signal applying means, responsive to a signal generated by the signal generating means, for applying to the plurality of the first electrodes a first electrode driving signal for driving the first electrodes, which includes either a potential corresponding to a display or a potential corresponding to a non-display, as a display data signal of a pixel of each frame included in the tone representing cycle, in correspondence with a tone to be represented by the pixel, second electrode driving signal applying means, responsive to a signal generated by the signal generating means, for sequentially applying to each of the second electrodes a second electrode driving signal including a selecting potential for selecting a second electrode.

Accordingly, in the display apparatus according to the present invention, a potential to be applied to a pixel by the first electrode driving signal applying means and the second electrode driving signal applying means is determined based on a signal whose phase is inverted every period of integral multiple of the tone representing cycle.

According to a preferred embodiment, a potential corresponding to the display exceeds a predetermined level, the data corresponding to the non-display does not exceed the predetermined level, and a difference of the potential corresponding to the display and the selecting potential corresponds to a first driving voltage for driving a pixel to be on, and a difference between the potential corresponding to the non-display and the selecting potential corresponds to a second driving voltage for driving a pixel to be off. In each of the plurality of frame periods included in the tone representing cycle, included is a period in which a potential corresponding to the display or the non-display, and a selecting potential are simultaneously applied to a pixel. Accordingly, each pixel is driven to be on (or off) the number of times corresponding to a tone to be displayed every tone representing cycle, like a conventional one.

According to the preferred embodiment, the first electrode driving signal applying means inverts a polarity of the first electrode driving signal to be applied to the first electrodes, in response to a polarity of a signal from the signal generating means, and the second electrode driving voltage applying means changes a polarity of the second electrode driving signal to be applied to the second electrodes, in response to a polarity of a signal from the signal generating means. Accordingly, considering two tone representing cycle periods separated from each other by the period of the integral multiple of the tone representing cycle period, a polarity of the first electrode driving signal in a frame period is different from the first electrode driving signal in the corresponding frame period, and the polarity of the second electrode driving signal is also different from the second electrode driving signal in the corresponding frame period. As a result, in the said adjacent two tone representing cycles, each polarity of effective voltages applied to the pixels is opposite to each other in the corresponding frame periods. That is, with respect to an arbitrary pixel, a positive polarity portion and a negative polarity portion of an effective voltage to be applied in a tone representing cycle are completely canceled by a negative polarity portion and a positive polarity portion of an effective voltage to be applied to the pixel in the tone representing cycle coming after a period of integral multiple of the tone representing cycle, respectively. Therefore, no direct voltage is applied to a liquid crystal constituting a pixel.

According to the preferred embodiment, the signal generating means comprises alternating inverted signal outputting means for outputting an alternating inverted signal whose polarity is inverted every other frame, modulation control signal outputting means for outputting a modulation control signal whose polarity is inverted every period of the integral multiple of the tone representing cycle, and modulating means for modulating the alternating inverted signal outputted from the alternating inverted signal outputting means by the modulation control signal outputted from the modulation control signal outputting means. Furthermore, the alternating inverted signal outputting means and the modulation control signal outputting means preferably comprise in common, clock generating means for outputting a third clock pulse in synchronization with a generation of a first clock pulse, based on the first clock pulse generated every one frame period and a second clock pulse generated in a higher frequency than a generation frequency of the first clock pulse, and counting means for counting the third clock pulse outputted from the clock generating means and for outputting the counted value as four-bit digital data, and the modulating means comprise a two-input EX-OR gate for receiving a least significant bit data and a second significant bit data as inputs out of the four-bit digital data outputted from the counting means. Preferably, the clock generating means includes an two-input NAND gate for receiving the first clock pulse and the second clock pulse as inputs.

A method of driving a display panel including the first and second electrodes according to the present invention comprises the steps of defining a tone representing cycle including a predetermined period of a plurality of frames as one cycle, generating every period of the integral multiple of the defined tone representing cycle, a signal which waveform is of an opposite polarity of that of a signal waveform in an adjacent period of integral multiple of the tone representing cycle, applying to the plurality of first electrodes a first electrode driving signal for driving the first electrodes, which includes either a potential corresponding to a display or a potential corresponding to a non-display, as a display data signal of a pixel of each frame included in the tone representing cycle, in response to the generated signal, in correspondence with a tone to be represented by the pixel, and sequentially applying to each of the plurality of the second electrodes second electrode driving signal including a selecting potential for selecting any of the plurality of second electrodes in response to the generated signal.

According to a display apparatus and a method of driving a display panel in accordance with the present invention, a positive polarity portion and a negative polarity portion of a driving voltage to be applied to a pixel completely cancel to each other in two tone representing cycle periods separated from each other by the period of the integral multiple of the tone representing cycle periods, thereby making it possible to display a tone by the data thinning-out system without application of a direct voltage to a pixel. Accordingly, a tone pattern can be selected without taking into account of the application of the direct voltage to the pixel, so that a range of selecting a tone pattern is extended. Therefore, flickering on a picture plane can be suppressed to the minimum, resulting in an improvement of a picture quality.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7A to FIG. 7H and FIG. 8A to 8H are timing charts for explaining an operation of the liquid crystal display apparatus shown in FIG. 4.

DESCRIPTION OF THE PREFERRED EMBODIMENTS

Figure 4:
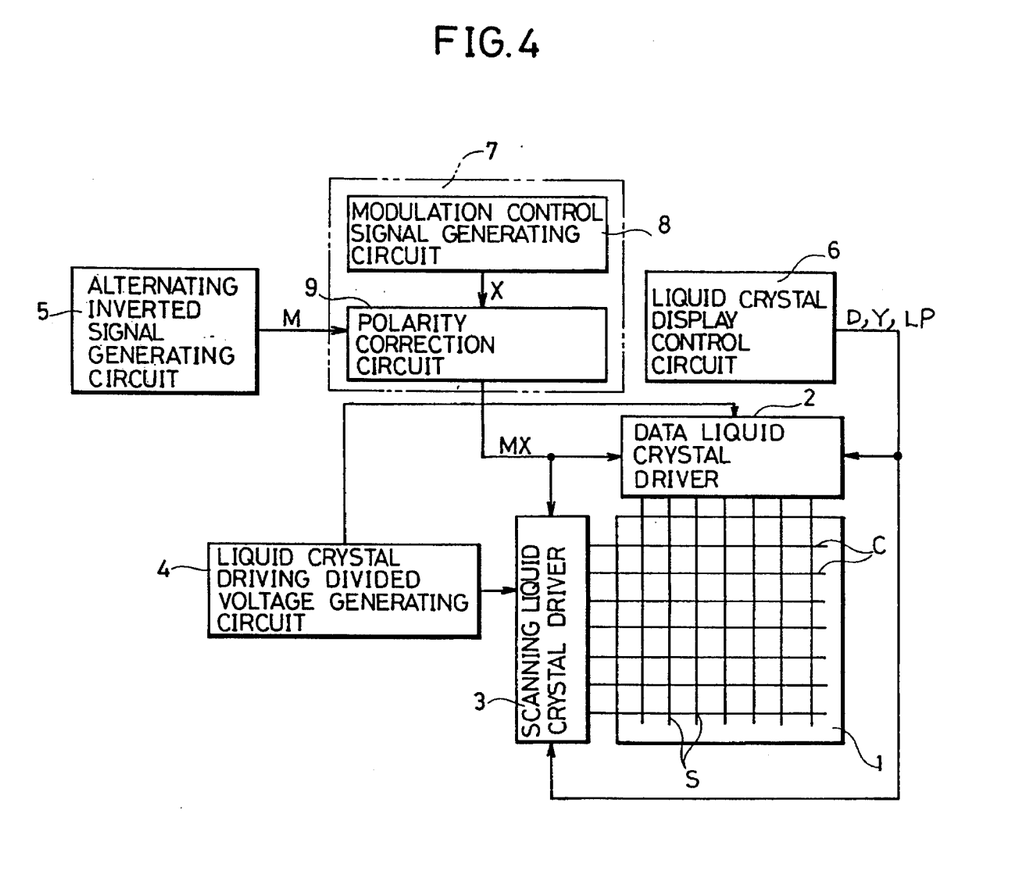
FIG. 4 is a schematic block diagram of a display apparatus according to one embodiment of the present invention.

FIG. 4 is a schematic block diagram showing a structure of a display apparatus of a simple matrix type according to one embodiment of the present invention.

The display apparatus represents 5 tones by using a tone representing cycle of a 4-frame period. The display apparatus as the liquid crystal panel shown in FIG. 1A and FIG. 1B comprises a liquid crystal display element 1 of a simple matrix type. The liquid crystal display element 1 includes, as the panels shown in FIG. 1A and FIG. 1B, two transparent substrates, liquid crystal layer interposed therebetween, a plurality of data electrodes S arranged inside of one of the transparent substrates, and a plurality of scanning electrodes C arranged inside of the other transparent substrate so as to intersect with the data electrodes S. The liquid crystal display element 1 comprises a data liquid crystal driver 2 for applying to the data electrodes S of the liquid crystal display element 1 either a voltage of a level corresponding to a display or a non-display according to display data, with a polarity based on a modulated alternating inverted signal MX which will be described later, a scanning liquid crystal driver 3 for applying to the scanning electrodes C of the liquid crystal display element 1 either a voltage of a level corresponding to selection or non-selection, with a polarity based on the modulated alternating inverted signal MX, a liquid crystal driving divided voltage generating circuit 4 for selectively supplying to the data liquid crystal driver 2 a voltage of each level corresponding to the display/non-display, and for selectively supplying to the scanning liquid crystal driver 3, a voltage of each level corresponding to the selection/non-selection, an alternating inverted signal generating circuit 5 for generating an alternating inverted signal M whose polarity is inverted every other frame period, and a liquid crystal display control circuit 6. The liquid crystal display control circuit 6 outputs, for example, display data D of the data thinning-out system for allowing a pixel of the liquid crystal display element 1 to display five tones, a scanning starting signal Y for starting the scanning of each frame, and a data latch signal LP for defining timing for applying a selecting potential to the scanning electrodes C and timing for applying a voltage, corresponding to display data of a pixel on each of the scanning electrodes, to the data electrodes S. The display apparatus further comprises an alternating inverted signal modulating circuit 7 for inverting a polarity of the alternating inverted signal M every tone representing cycle to output a modulated alternating inverted signal MX in order to determine a polarity of a voltage corresponding to display/non-display supplied to the data liquid crystal driver 2 and a polarity of a voltage corresponding to selection/non-selection supplied to the scanning liquid crystal driver 3.

The alternating inverted signal modulating circuit 7 comprises a modulation control signal generating circuit 8 for outputting a modulation control signal X whose polarity is inverted every above described tone representing cycle, based on the scanning starting signal Y outputted from the liquid crystal display control circuit 6, and a polarity collection circuit 9 for inverting a polarity of the alternating inverted signal M, based on the modulation control signal X.

Figure 5:
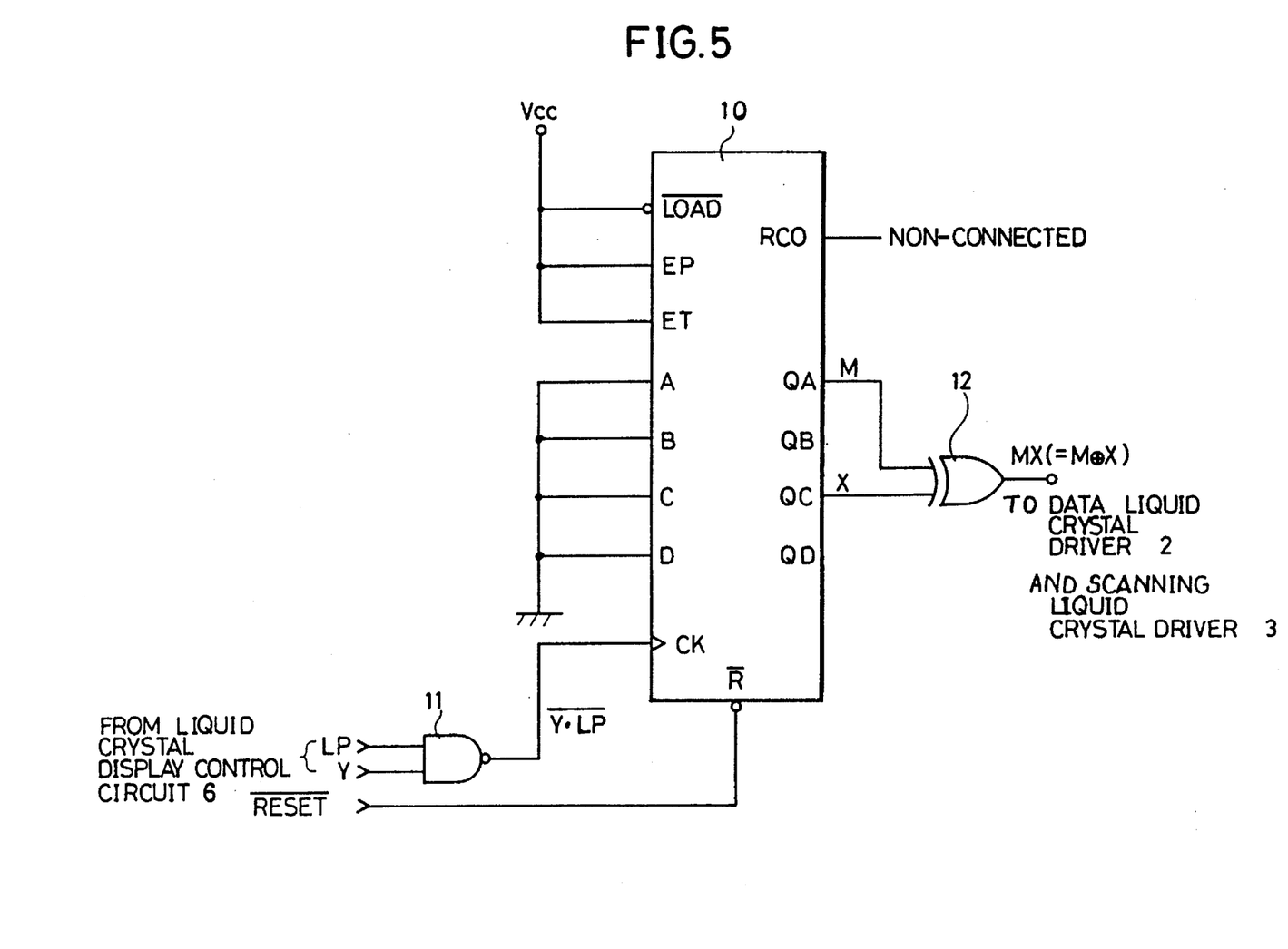
FIG. 5 is a circuit diagram showing a structure of a part of a function portion shown in FIG. 4, FIG. 6A to FIG. 6I are timing charts for explaining an operation of the circuit shown in FIG. 5.

FIG. 5 is a circuit diagram showing a structure of the alternating inverted signal, modulating circuit 5 and the alternating inverted signal modulating circuit 7 in detail.

An operation of the circuit shown in FIG. 5 will be described in detail with reference to FIG. 6A to FIG. 6I in the following.

Figure 6A:
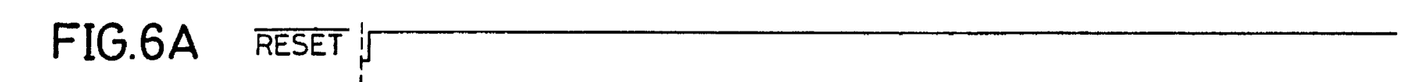
Figure 6B:
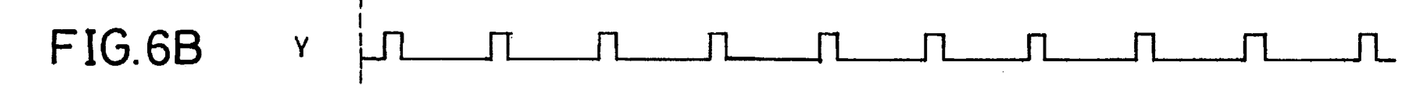
Figure 6C:
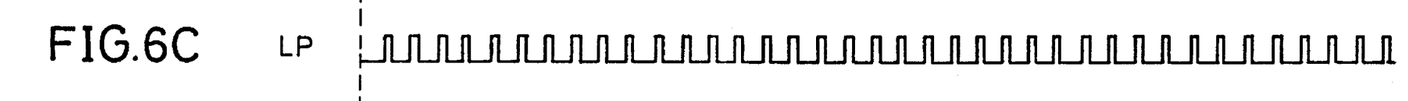
Figure 6D:
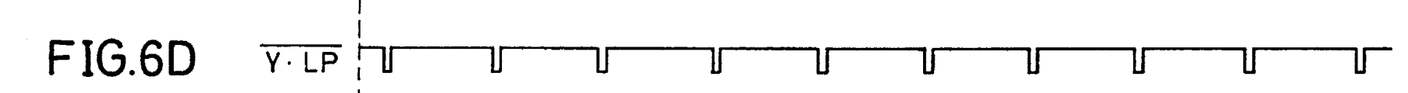
Figure 6E:
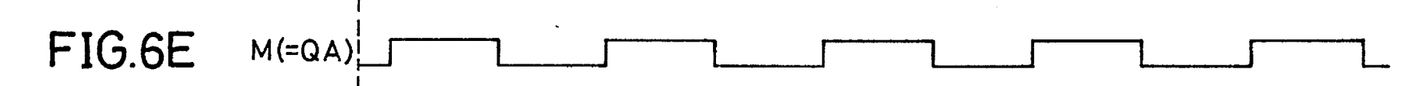
Figure 6F:
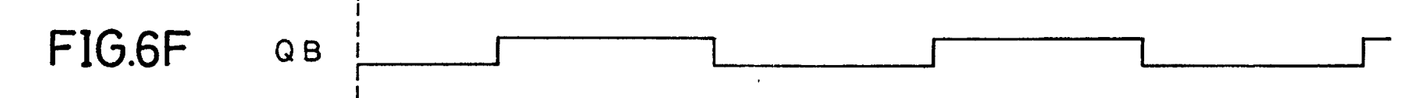
Figure 6G:
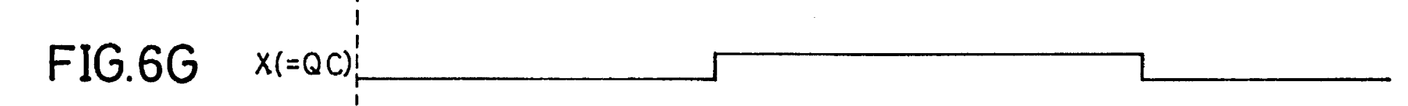
Figure 6H:
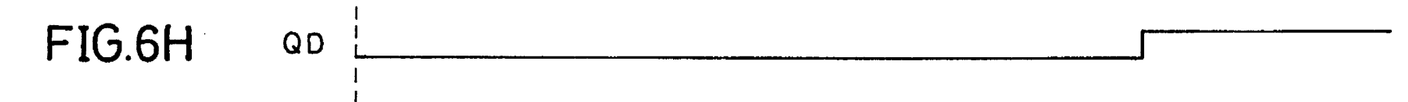
Figure 6I:
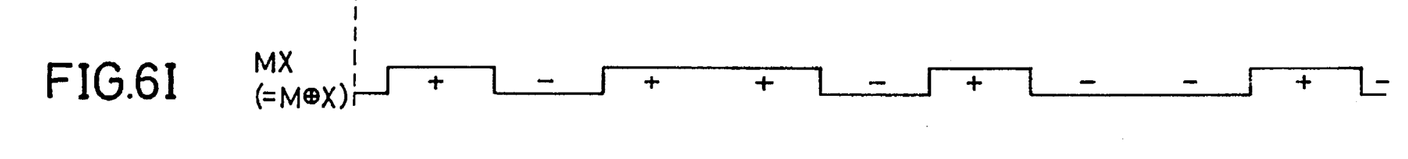

FIG. 6A shows a waveform of a reset signal $\overline{\text{RESET}}$ which will be described later, FIG. 6B shows a waveform of the scanning starting signal Y, FIG. 6C shows a waveform of the data latch signal LP, FIG. 6D shows a waveform of an output signal $\overline{Y \cdot LP}$ of an NAND gate 11 which will be described later, FIG. 6E shows a waveform of the alternating inverted signal M, FIG. 6F shows a waveform of an output signal from an output terminal QB of an hexadecimal counter 10 which will be described later, FIG. 6G shows a waveform of the modulation control signal X, FIG. 6H shows a waveform from an output terminal QD of the hexadecimal counter 10, and FIG. 6I shows a waveform of the modulated alternating inverted signal MX. The reset signal $\overline{RESET}$ is applied to the hexadecimal counter 10 from the external of the display apparatus or from the pixel display control circuit 6 shown in FIG. 4, for enabling/disabling a function of the hexadecimal counter 10.

In FIG. 5, the hexadecimal counter 10 is a circuit used in common as a component of the alternating inverted signal generating circuit 5 and the alternating inverted signal modulating circuit 7, which comprises a non-connected output terminal RCO, and input terminals CK and $\overline{R}$, and receives a power supply potential Vcc at input terminals $\overline{LOAD}$, EP and ET, and a ground potential at input terminals A, B, C and D. The hexadecimal counter 10 stops its operation when the reset signal $\overline{RESET}$ inputted to a reset input terminal $\overline{R}$ is at the "L" (logical low) level, and is operable when the reset signal $\overline{RESET}$ is at the "H" (logical high) level as shown in FIG. 6A. In operation, the hexadecimal counter 10 counts the number of clocks inputted to a clock input terminal CK from an NAND gate 11 and outputs the counted value as a parallel 4-bit signal from output terminals QD, QC, QB and QA. A least significant bit, a third most significant bit, a second most significant bit and a most significant bit of the 4-bit parallel signal are outputted from the output terminals QA, QB, QC and QD, respectively.

The clock input terminal CK is connected to an output terminal of the two-input NAND gate 11 to which the scanning starting signal Y (refer to FIG. 6B) rising in a predetermined cycle, and the data latch signal LP (refer to FIG. 6C) having a much higher frequency than that of the scanning start signal Y, both of which are outputted from the above described liquid crystal display control circuit 6. Accordingly, the output signal $\overline{Y \cdot LP}$ of the NAND gate 11 falls in almost the same cycle as a rising cycle of the scanning start signal Y, as shown in FIG. 6D. The output signal $\overline{Y \cdot LP}$ of the NAND gate 11 is applied to the input terminal CK of the counter 10 as a clock.

The hexadecimal counter 10 counts the number of rises of the output signal $\overline{Y \cdot LP}$ of the NAND gate 11 as the clock numbers. An output signal from the least significant bit output terminal QA of the hexadecimal counter 10 is used as the alternating inverted signal M and an output signal from the second most significant bit output terminal QC is used as the modulation control signal X.

Digital values of the least significant bit, the third most significant bit, the second most significant bit and the most significant bit outputted from the counter 10 are inverted as a rise of the output signal $\overline{Y \cdot LP}$ of the NAND gate 11 is counted by the hexadecimal counter 10 once, twice, four times and eight times, respectively. Accordingly, the output signal from the least significant bit output terminal QA of the counter 10, that is, the alternating inverted signal M has a level inverted every rise of the signal $\overline{Y \cdot LP}$ as shown in FIG. 6E, and the output signal from the third most significant bit output terminal QB of the counter 10 becomes a signal which is frequency-divided to half of the frequency of the alternating inverted signal M. Similarly, the output signal from the second most significant bit output terminal QC of the counter 10, that is, the modulation control signal X, is a signal which is further frequency-divided to half of the frequency of the output signal from the output terminal QB, as shown in FIG. 6G, and the output signal from the most significant bit output terminal QD is a signal which is further frequency-divided to half of the frequency of the modulation control signal X.

The signals M and X are applied to a two-input EX-OR gate 12. Accordingly, the EX-OR gate 12 takes an exclusive OR (M⊕X) of the alternating inverted signal M and the modulation control signal X, and outputs a signal whose phase is inverted by 180° every cycle four times a rising cycle of the scanning starting signal Y as shown in FIG. 6I. An output signal of the EX-OR gate 12 is applied to the data liquid crystal driver 2 and the scanning driver 3 as the modulated alternating inverted signal MX.

More specifically, in FIG. 5, the hexadecimal counter 10 and the NAND gate 11 serve as the alternating inverted signal generating circuit 5 and the modulation control signal generating circuit 8 in the alternating inverted signal modulating circuit 7 in FIG. 4, and the EX-OR gate 12 constitutes a polarity correction circuit 9 in the alternating inverted signal modulating circuit 7 in FIG. 4.

Now, referring to the timing charts in FIG. 6A to FIG. 6I and FIG. 7A to 7H, description will be given of a tone displaying operation of the display apparatus, in which a tone pattern in driving a pixel to be on twice in a tone representing cycle is, for example, "1, 0, 1, 0", with respect to an arbitrary pixel whose tone pattern is "1, 0, 1, 0".

Figure 7A:
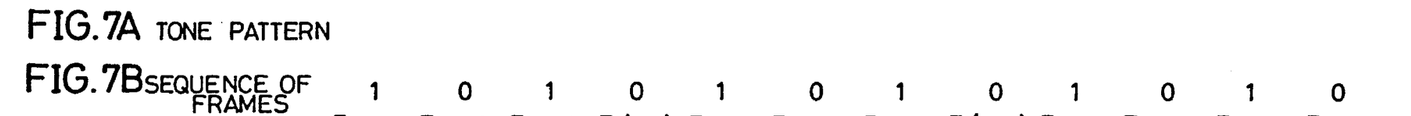
Figures 7C, 7D, 7E, 7F, 7G:
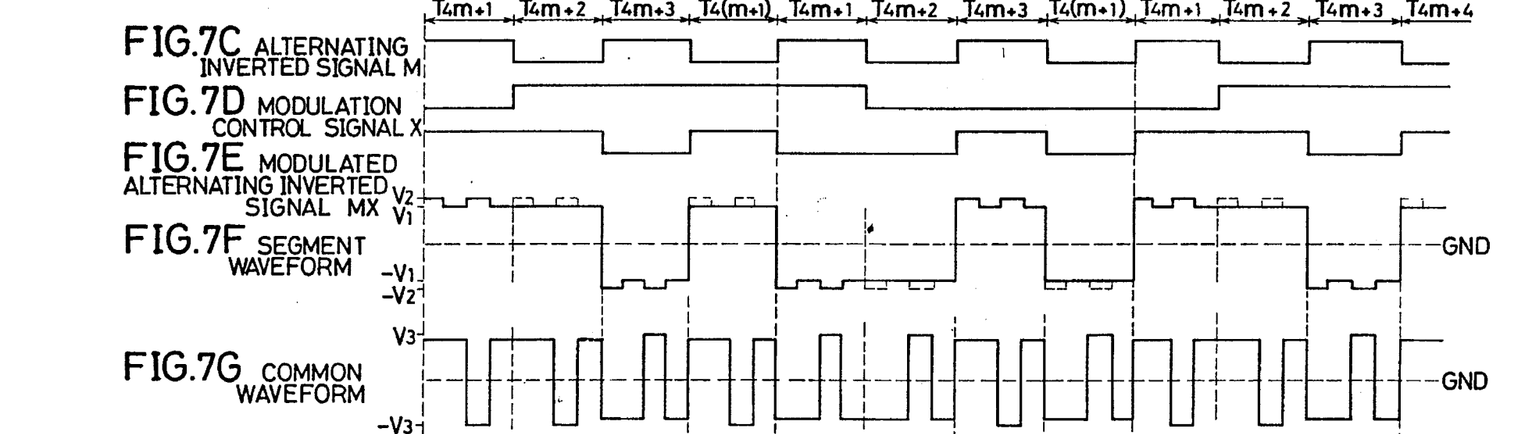
Figure 7H:
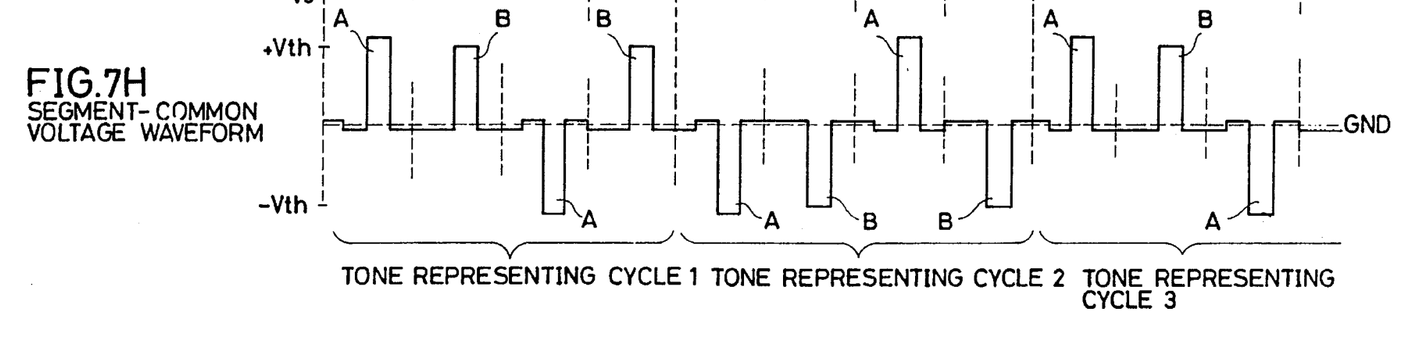

FIG. 7A to FIG. 7H are timing charts for explaining an operation of the display apparatus shown in FIG. 4 to display five tones by the data thinning-out system with a four-frame period as a tone representing cycle. FIG. 7A shows a tone pattern, FIG. 7B shows a sequence of frames, FIG. 7C shows a waveform of the alternating inverted signal M. FIG. 7D shows a waveform of the modulation control signal X, FIG. 7E shows a waveform of the modulated alternating inverted signal MX, FIG. 7F shows a waveform of a voltage applied to the data electrodes S, that is, a segment waveform, FIG. 7G shows a waveform of a voltage applied to the scanning electrodes C, that is, a common waveform, and FIG. 7H shows a waveform of an effective voltage applied to a pixel formed of a liquid crystal layer interposed between the data electrodes S and the scanning electrodes C, that is, a waveform of a segment-common voltage. In the present embodiment, the number of duties of the voltage applied to the data electrodes S and the scanning electrodes C is 4.

As shown in FIG. 6E, a polarity of the alternating inverted signal M outputted from the alternating inverted signal generating circuit 5 is inverted at timing in synchronization with a rise of the scanning starting signal Y (FIG. 6B). While, wherein the data liquid crystal driver 2 and the scanning liquid crystal driver 3 perform a frame scanning in synchronization with a rise of the scanning starting signal Y. That is, a rise period of the signal Y corresponds to one frame period, and a polarity of the alternating inverted signal M is inverted every other frame period. On the other hand, a polarity of the modulation control signal X outputted from the modulation control signal generating circuit 8 is inverted every 4 frame period corresponding to the tone representing cycle as shown in FIG. 6G. Accordingly, a phase of the modulated alternating inverted signal MX taken from the polarity correction circuit 9 as an exclusive OR signal of the two signals M and X is inverted between an arbitrary 4-frame period and the subsequent 4-frame period as shown in FIG. 6I.

The data liquid crystal driver 2 applies a voltage having a waveform corresponding to a display or a non-display, that is, a waveform (display) including a voltage above the value plus V1 in FIG. 2C and a waveform (non-display) not-including a voltage above the value +V1 to the data electrodes S, and inverts a polarity of the same, every time a polarity of the modulated alternating inverted signal MX is inverted. In the same manner, the scanning liquid crystal driver 3 applies a voltage having a waveform in which it appears a potential +V3 only in a ¼ frame period of a one frame period (refer to FIG. 2D) to the scanning electrodes C and inverts a polarity of the same, every time a polarity of the modulated alternating inverted signal MX is inverted.

As shown in FIG. 7B, in case where a pixel is driven to be on twice in a tone representing cycle including 4-frame periods $T_{4m+1}$, $T_{4m+2}$, $T_{4m+3}$, $T_{4(m+1)}$ (m=0, 1, 2 . . .) as one cycle, when a tone pattern is set to "1, 0, 1, 0" as shown in FIG. 7A, a level of the segment waveform becomes a level corresponding to a off-drive in the frame periods $T_{4m+1}$ and $T_{4(m+1)}$, as shown in FIG. 7F. Assuming that a polarity of the alternating inverted signal M is inverted so as to be positive in the frame period $T_{4m+1}$ and to be negative in the frame period $T_{4m+2}$ as shown in FIG. 7C, and a polarity of the modulation control signal X is alternately inverted so as to be positive from the frame period $T_{4m+2}$ in the first 4-frame period (the tone presenting cycle 1 in the drawing) to the frame period $T_{4m+1}$ of the next 4-frame period (the tone representing cycle 2 in the drawing) and be negative during the subsequent 4 frame-period, a polarity of the modulated alternating inverted signal MX becomes positive in the frame periods $T_{4m+1}$, $T_{4m+2}$ and $T_{4(m+1)}$ of the first 4-frame period, negative in the frame period $T_{4m+3}$, and conversely it becomes negative in the frame period $T_{4m+1}$, $T_{4m+2}$ and $T_{4(m+1)}$ of the subsequent 4-frame period, and becomes positive in the frame period $T_{4m+3}$ as shown in FIG. 7E. The polarity of the segment waveform and the common waveform will be as represented in FIG. 7F and FIG. 7G, respectively, since it is determined, as described above, according to a polarity of the modulation alternating inverted signal, MX.

Accordingly, a waveform of the segment-common voltage in the first 4-frame period becomes, as shown in FIG. 7H, an on-drive waveform of the positive polarity, which includes a portion A above a threshold voltage +Vth in the first frame period $T_{4m+1}$, an off-drive waveform of the positive polarity, which includes a portion B below the threshold voltage +Vth in the second frame period $T_{4m+2}$, an on-drive waveform of the negative polarity, which includes the portion A above the threshold voltage -Vth in the third frame period $T_{4m+3}$, and an off-drive waveform of the positive polarity, which includes the portion B below the threshold voltage +Vth in the fourth frame period $T_{4(m+1)}$. A waveform of the segment-common voltage in the subsequent 4-frame period will be opposite to the first 4-frame period, an on-drive waveform of the negative polarity in the first frame period $T_{4m+1}$, an off-drive waveform of the negative polarity in the second frame period $T_{4m+2}$, an on-drive waveform of the positive polarity in the third frame period $T_{4m+3}$ and an off-drive waveform of the negative polarity in the fourth frame period $T_{4(m+1)}$.

More specifically, waveforms of the segment-common voltage in the first, the second, the third and the fourth frame periods of the first 4-frame period and waveforms of the segment-common voltage in the first, the second, the third and the fourth frame periods of the subsequent 4-frame period are completely symmetrical with respect to the ground potential, respectively. Therefore, with the tone representing cycle being repeated, a mean value of an effective voltage applied to a pixel in a period of two tone representing cycles becomes 0 because the segment-common voltages cancel to each other in the respective 4-frame periods of the two tone representing cycles. As a result, no direct voltage is applied to a pixel.

Figures 8A, 8B, 8C, 8D, 8E, 8F:
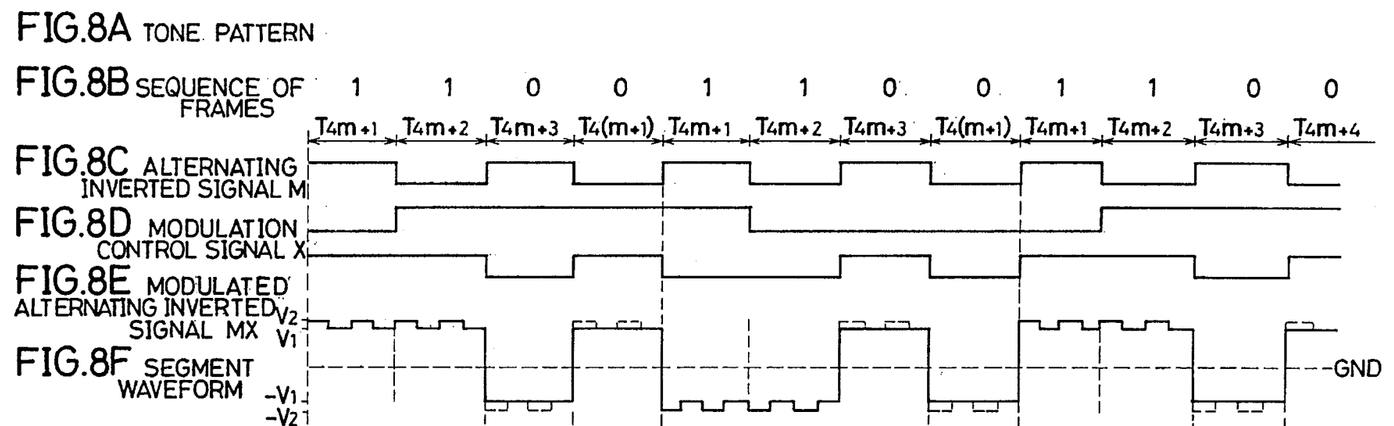
Figure 8G:
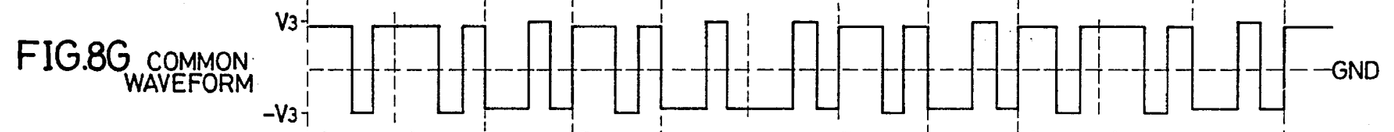
Figure 8H:
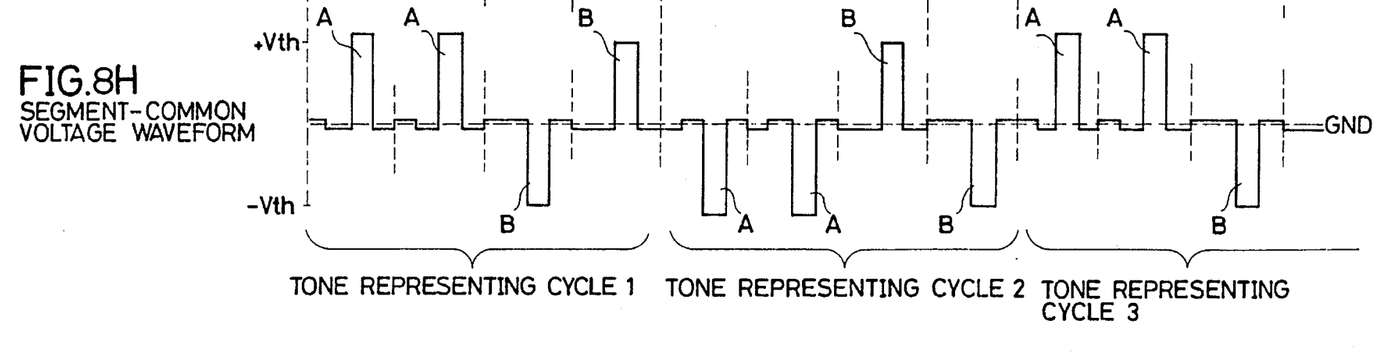

FIG. 8A to FIG. 8H are timing charts for explaining a tone displaying operation of the display apparatus in which, a tone pattern is "1, 1, 0, 0" in case a pixel is driven to be on twice in a tone representing cycle with respect to an arbitrary pixel having a tone pattern of "1, 1, 0, 0". FIG. 8A shows a tone pattern, FIG. 8B shows a sequence of frames, FIG. 8C shows a waveform of the alternating inverted signal M, FIG. 8D shows a waveform of the modulation control signal X, FIG. 8E shows a waveform of the modulated alternating inverted signal MX, FIG. 8F shows a waveform of a voltage applied to the data electrodes S, that is, a segment waveform, FIG. 8G shows a waveform of a voltage applied to the scanning electrodes C, that is, a common waveform, and FIG. 8H shows a waveform of an effective voltage applied to a pixel formed of liquid crystal layers interposed between the data electrodes S and the scanning electrodes S, that is, a waveform of the segment-common voltage.

Now assuming that the alternating inverted signal M and the modulation control signal X are the same as those shown in FIG. 7C and FIG. 7D, respectively, a waveform of the segment-common voltage in this case will be, as shown in FIG. 8H, an on-drive waveform including the portion A above the threshold voltage +Vth in the first and the second frame periods of the first 4-frame period, an off-drive waveform including the portion B below the threshold -Vth in the third frame period, and an off-drive waveform including the portion B below the threshold +Vth in the fourth frame period. Then, a waveform of the segment-common voltage in the subsequent 4-frame period will be opposite to the first 4-frame period, an on-drive waveform including the portion A above the threshold voltage -Vth in the first and the second frame periods, an off-drive waveform including the portion B below the threshold +Vth in the third frame period, and an off-drive waveform including the portion B below the threshold -Vth in the fourth frame period.

Accordingly, also in this case, waveform of the segment-common voltage in the first, the second, the third and the fourth frame periods of the first 4-frame period and waveform of the segment-common voltage in the first, the second, the third and the fourth frame periods of the subsequent 4-frame period are completely symmetrical with respect to the ground potential, respectively. Therefore, with the tone representing cycle being repeated, a mean value of an effective voltage to a pixel in a period of two tone representing cycles becomes 0 because the segment-common voltages cancel to each other in the respective 4-frame periods of the two tone representing cycles. As a result, no direct voltage is applied to a pixel. This is because in the present embodiment, a phase of the modulated alternating inverted signal for determining a polarity of the segment-common voltage in each frame period is inverted in the same cycle as the tone representing cycle, so that the segment-common voltages in the corresponding frame periods in the adjacent tone representing cycles have the same waveform except that its polarity is opposite to each other, irrespective of the tone pattern. That is, according to the present embodiment, as long as a tone representing cycle is repeated even number times, no direct voltage is applied to a pixel by any tone pattern.

In the above described embodiment, although the description was given of a case in which a positive polarity portion and a negative polarity portion of a segment-common voltage completely cancel to each other every period twice the tone representing cycle by inverting a waveform polarity of the modulated alternating inverted signal MX every period the same as the tone representing cycle, that is, by inverting a phase of the modulated alternating inverted signal MX every tone representing cycle, the same effect as that of the present embodiment can be obtained even if a polarity of the modulated alternating inverted signal MX is inverted every period of integral 1 (l=2, 3, 4, . . .) multiple of the tone representing cycle. More specifically, in case that a waveform polarity of the modulated alternating inverted signal MX in a tone representing cycle is inverted every period of integral l multiple of the tone representing cycle, waveforms of segment-common voltages in the corresponding frame periods become completely symmetrical in two tone representing cycles separated from each other by the period of the integral l multiple of the tone representing cycle periods with respect to the ground potential. That is, the positive polarity portion and the negative polarity portion of the segment-common voltage completely cancel to each other in the frame periods separated from each other by the period of the integral l multiple of the tone representing cycle periods. Accordingly, in this case, as long as the tone representing cycle is repeated 2 l times, no direct voltage is continuously applied to a pixel even if any tone display is performed with any tone pattern.

However, since it is desirable that in a transitional period in which a positive polarity portion and a negative polarity portion of an effective voltage to be applied to a pixel completely cancel to each other, a time duration for applying a direct voltage to the pixel is negligibly short, a value of the l should not be large.

A tone representing cycle is not limited to a 4-frame period, but can be an arbitrary period. In addition, means for generating the alternating inverted signal M, the modulation control signal X and the modulated alternating inverted signal MX is not limited to the present embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A display apparatus, comprising:

a plurality of data electrodes, arranged parallel to each other;

a plurality of scanning electrodes, arranged parallel to each other so as to intersect said plurality of data electrodes, the intersections defining a plurality of pixels arranged in a matrix;

defining means for defining a plurality of tone representing cycles, each including a predetermined number of frames;

modulated alternating inverted signal generating means for generating a modulated alternating inverted signal, having one polarity in a majority of said predetermined number of frames in one of said plurality of tone representing cycles and the opposite polarity in a majority of said predetermined number of frames in a subsequent one of said plurality of tone representing cycles, polarity being defined as having either a positive or negative potential with respect to a ground;

data signal generating means for generating a data signal, to be applied to said plurality of data electrodes, whose polarity is inverted when the polarity of the modulated alternating inverted signal inverts; and scanning signal generating means for generating a scanning signal, to be applied to said plurality of scanning electrodes, whose polarity is inverted when the polarity of the modulated alternating inverted signal inverts;

wherein a pixel waveform, applied to said plurality of pixels, equals the data signal minus the scanning signal, wherein said pixel waveform does not introduce a direct current bias voltage component to said plurality of pixels and reduces flicker in said display apparatus for a plurality of gray scale tones.

2. The display apparatus of claim 1, said modulated alternating inverted signal generating means including, alternating inverted signal generating means for generating an alternating inverted signal, whose polarity is inverted every other of said predetermined number of frames for each of said plurality of tone representing cycles, modulating control signal generating means for generating a modulation control signal, whose polarity is inverted for each of said plurality of tone representing cycles and whose phase is delayed by one frame for each of said plurality of tone representing cycles, and modulated signal generating means for generating the modulated alternating inverted signal by combining the alternating inverted signal and the modulation control signal wherein the polarity of the modulated alternating inverted signal is inverted for each of said plurality of tone representing cycles.

3. The display apparatus of claim 2, wherein the pixel waveform includes a first potential corresponding to a display state of said plurality of pixels and a second potential corresponding to a non-display state of said plurality of pixels, wherein the first potential exceeds a predetermined threshold potential and the second potential is equal to or less than the predetermined threshold potential and wherein said display apparatus is a liquid crystal display.

4. The display apparatus of claim 2, wherein the alternating inverting signal and the modulation control signal are combined utilizing an exclusive OR gate.

5. The display apparatus of claim 3, wherein a first difference between the first potential and the predetermined threshold potential corresponds to a first driving voltage for placing said plurality of pixels in the display state, a second difference between the second potential and the predetermined threshold potential corresponds to a second driving voltage for placing said plurality of pixels in the non-display state, and each of said predetermined number of frames included in each of said plurality of tone representing cycles includes a period in which each of the first potential and the second potential and the predetermined threshold potential are applied to one of said plurality of pixels.

6. The display apparatus of claim 1, wherein:

the data signal has a positive polarity when the modulated alternating inverted signal has a positive polarity and the data signal has a negative polarity when the modulated alternating inverted signal has a negative polarity, and the scanning signal has a positive polarity when the modulated alternating inverted signal has a negative polarity and the scanning signal has a negative polarity when the modulated alternating inverted signal has a positive polarity.

7. The display apparatus of claim 2, said modulated alternating inverted signal generating means further including, clock generating means for generating a third clock pulse in synchronization with a generation of a first clock pulse, based on said first clock pulse generated every frame and a second clock pulse generated at a higher frequency than that of said first clock pulse, and counting means for counting the number of pulses in said third clock pulse generated from said clock generating means and for outputting the counted number as digital data.

8. The display apparatus of claim 2, wherein said clock generating means includes a two-input NAND gate for receiving said first clock pulse and second clock pulse as inputs.

9. The display apparatus of claim 1, wherein said data signal generating means generates said data signal, to be applied to said plurality of data electrodes, whose polarity is equal to the polarity of the modulated alternating inverted signal and whose polarity is inverted when the polarity of the modulated alternating inverted signal inverts; and said scanning signal generating means generates said scanning signal, to be applied to said plurality of scanning electrodes, whose polarity is opposite from the polarity of the modulated alternating inverted signal and whose polarity is inverted when the polarity of the modulated alternating inverted signal inverts.

10. A method for driving a display apparatus which includes a plurality of data electrodes and a plurality of scanning electrodes arranged in mutually intersecting perpendicular directions, the intersections defining a plurality of pixels, the method comprising the steps of:

(a) defining a plurality of tone representing cycles, each including a predetermined number of frames;

(b) generating a modulated alternating inverted signal, having one polarity in a majority of said predetermined number of frames in one of said plurality of tone representing cycles and the opposite polarity in a majority of said predetermined number of frames in a subsequent one of said plurality of tone representing cycles, polarity being defined as having either a positive or negative potential with respect to a ground;

(c) generating a data signal, to be applied to said plurality of data electrodes, whose polarity is inverted when the polarity of the modulated alternating inverted signal inverts;

(d) generating a scanning signal, to be applied to said plurality of scanning electrodes, whose polarity is inverted when the polarity of the modulated alternating inverted signal inverts; and (e) applying a pixel waveform to said plurality of pixels, equal to the data signal minus the scanning signal, wherein said pixel waveform does not introduce a direct current bias voltage component to said plurality of pixels and reduces flicker in said display apparatus for a plurality of gray scale tones.

11. The method of claim 10, said step (b) including the sub-steps of:

(b)(1) generating an alternating inverted signal, whose plurality is inverted every other of said predetermined number of frames for each of said plurality of tone representing cycles, (b)(2) generating a modulation control signal, whose polarity is inverted for each of said plurality of tone representing cycles and whose phase is delayed by one frame for each of said plurality of tone representing cycles, and (b)(3) generating the modulated alternating inverted signal by combining the alternating inverted signal and the modulation control signal wherein the polarity of the modulated alternating inverted signal is inverted for each of said plurality of tone representing cycles.

12. The method of claim 11, wherein the pixel waveform includes a first potential corresponding to a display state of said plurality of pixels and a second potential corresponding to a non-display state of said plurality of pixels, wherein the first potential exceeds of predetermined threshold potential and the second potential is equal to or less than the predetermined threshold potential and wherein said display apparatus is a liquid crystal display.

13. The method of claim 11, wherein the alternating inverting signal and the modulation control signal are combined by performing an exclusive OR operation.

14. The method of claim 12, wherein a first difference between the first potential and the predetermined threshold potential corresponds to a first driving voltage for placing said plurality of pixels in the display state, a second difference between the second potential and the predetermined threshold potential corresponds to a second driving voltage for placing said plurality of pixels in the non-display state, and each of said predetermined number of frames included in each of said plurality of tone representing cycles includes a period in which each of the first potential and the second potential and the predetermined threshold potential are applied to one of said plurality of pixels.

15. The method of claim 10, wherein:

the data signal has a positive polarity when the modulated alternating inverted signal has a positive polarity and the data signal has a negative polarity when the modulated alternating inverted signal has a negative polarity, and the scanning signal has a positive polarity when the modulated alternating inverted signal has a negative polarity and the scanning signal has a negative polarity when the modulated alternating inverted signal has a positive polarity.

16. The method of claim 10, said step (b) further including the sub-steps of:

(b)(4) generating a third clock pulse in synchronization with a generation of a first clock pulse, based on said first clock pulse generated every frame and a second clock pulse generated at a higher frequency than that of said first clock pulse, and (b)(5) counting the number of pulses in said third clock pulse generated from said clock generating means and for outputting the counted number as digital data.

17. The method of claim 11, wherein said sub-step (b)(4) said first clock pulse and said second clock pulse are combined by performing a NAND operation, thereby generating said third clock pulse.

18. The method of claim 10, wherein said step (c) generates said data signal, to be applied to said plurality of data electrodes, whose polarity is equal to the polarity of the modulated alternating inverted signal and whose polarity is inverted when the polarity of the modulated alternating inverted signal inverts; and said step (d) generates said scanning signal, to be applied to said plurality of scanning electrodes, whose polarity is opposite from the polarity of the modulated alternating inverted signal and whose polarity is inverted when the polarity of the modulated alternating inverted signal inverts.

* * * * *